United States Patent [19]

Hopkins

[11] 4,419,466

[45] Dec. 6, 1983

[54] METHOD FOR CONTINUOUS PRODUCTION OF INVERT EMULSION POLYMERS

[75] Inventor: Thomas R. Hopkins, Chesterland, Ohio

[73] Assignee: The Lubrizol Corporation, Wickliffe, Ohio

[21] Appl. No.: 277,300

[22] Filed: Jun. 25, 1981

[51] Int. Cl.³ .............................................. C08J 3/10
[52] U.S. Cl. ................................... 523/324; 523/336; 523/337; 526/64; 526/88; 526/918; 526/920
[58] Field of Search ............... 260/29.6 WQ, 29.6 SQ; 526/64, 88, 918, 920; 523/324, 337, 336

[56] References Cited

U.S. PATENT DOCUMENTS

| | | | |
|---|---|---|---|
| 2,769,804 | 11/1956 | Hanson | 260/86.7 |
| 2,978,438 | 4/1961 | Erlenbach et al. | 260/78 |
| 3,324,093 | 6/1967 | Alleman | 260/88.2 |
| 3,551,396 | 12/1970 | Lanthier | 260/85.7 |
| 4,147,681 | 4/1979 | Lim et al. | 260/29.6 TA |
| 4,331,787 | 5/1982 | Fairchok et al. | 523/324 |

*Primary Examiner*—Joseph L. Schofer
*Assistant Examiner*—Bernard Lipman
*Attorney, Agent, or Firm*—Roger K. Hsu; J. Walter Adams; Raymond F. Keller

[57] ABSTRACT

Invert emulsion polymers are prepared by continuously circulating a system comprising a non-polar liquid and an aqueous solution of polymerizable monomers, continuously adding components to said system and continuously withdrawing a portion of said system comprising the desired invert emulsion polymer. The method is conveniently effected in a loop reactor. It is particularly effective for the production of invert emulsion polymers of acrylamidoalkanesulfonic acids and their salts; e.g., 2-acrylamido-2-methylpropanesulfonic acid.

18 Claims, 1 Drawing Figure

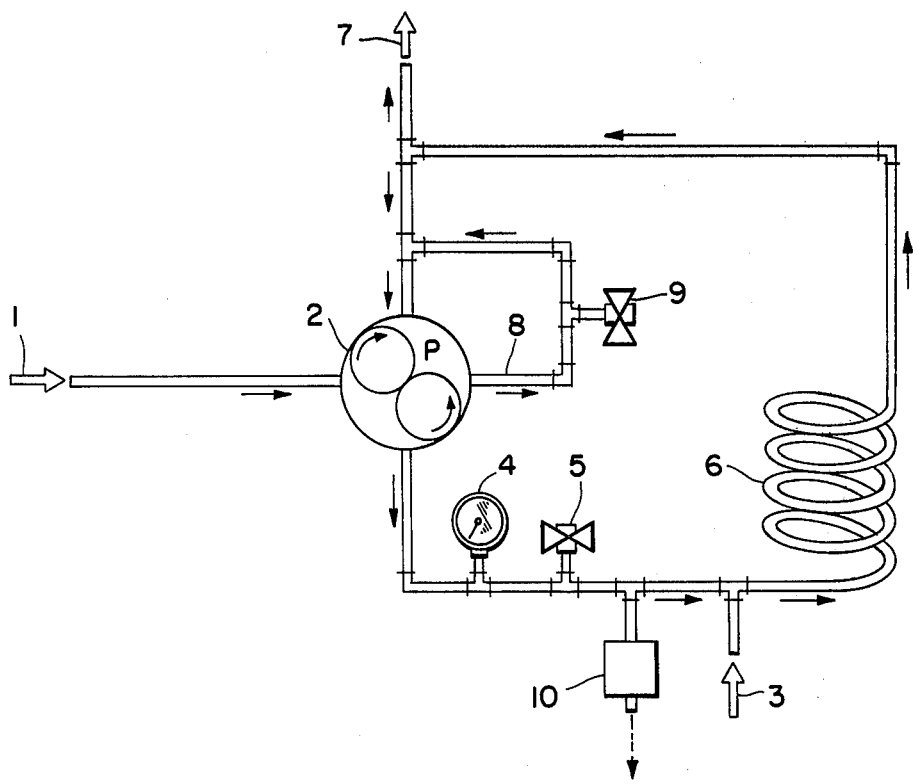

METHOD FOR CONTINUOUS PRODUCTION OF INVERT EMULSION POLYMERS

This invention relates to the preparation of polymeric compositions. In its broadest sense, the invention is directed to a method for preparing an invert emulsion polymer which comprises the steps of:

(I) continuously circulating, under polymerization conditions, a system comprising (A) a non-polar liquid which is inert to addition polymerization, and (B) an aqueous solution of one or more polymerizable monomers;

(II) continuously adding components A and B to said system under conditions and in proportions to produce said invert emulsion polymer; and (III) continuously withdrawing a portion of said system comprising said invert emulsion polymer.

A number of methods have been developed for the preparation of invert emulsion polymers of water-soluble monomers. Because of the increasing number of uses being developed for polymers of this type, however, interest continues in the development of improved methods for their production. Of particular interest are new methods by which such invert emulsion polymers may be prepared in highly reproducible manner, with a high degree of conversion and under relatively simple conditions. The present invention is a significant step in the attainment of these ends.

The polymers whose preparation by the method of this invention is contemplated include homopolymers, copolymers and higher interpolymers of any and all water-soluble monomers. Suitable monomers include acrylamide, methacrylamide, acrylic acid, methacrylic acid, maleic acid, maleic anhydride, fumaric acid, crotonic acid, sodium styrene sulfonate, 2-acrylamido-2-methylpropanesulfonic acid, 3-acrylamido-3-methylbutyltrimethylammonium chloride, 2-acrylamido-2-methylpropyl trimethylammonium chloride, 2-methacryloyloxyethyl trimethylammonium methosulfate, 3-methacryloyl-2-hydroxypropyl trimethylammonium chloride, dimethyldiallylammonium chloride, diethyldiallylammonium chloride and N-vinylpyrrolidone. For many purposes, the preferred monomers are acrylamide, methacrylamide and the acrylamidoalkanesulfonic acids and salts thereof, especially 2-acrylamido-2-methylpropanesulfonic acid and its salts. The method of the invention is particularly useful for the preparation of copolymers of acrylamide and 2-acrylamido-2-methylproanesulfonic acid or its salts.

As will be apparent from the description hereinabove, the method of this invention involves continuous circulation of a reaction mixture and continuous addition of reagents thereto and withdrawal of product therefrom. The reaction mixture comprises two component streams which are introduced into the continuous reaction system. Component A is a non-polar liquid which is inert to addition polymerization. It is frequently mineral oil, whereupon the invert emulsion product is a water-in-oil emulsion. However, it may also be another non-polar liquid such as naphtha, hexane, fuel oil, mineral spirits, benzene, toluene or xylene, provided that it is inert to addition polymerization. By "inert" is meant that component A does not itself undergo addition polymerization; the use as component A of liquids which may under some conditions serve as chain transfer agents is, however, within the scope of the invention. For example, such otherwise inert hydrocarbons as hexane and toluene are suitable even though they may under some conditions participate in telomerization reactions by serving as chain transfer agents.

Component A usually also contains minor amounts of emulsifying agents adapted for the stabilization of the invert emulsions. The preferred emulsifying agents are nonionic and include materials sold under the trade names "Igepal", "Tween" and "Span". Many of the suitable emulsifiers are polyoxyethylene condensates; others are fatty acid esters of various polyhydroxy compounds such as sorbitan.

Component B is an aqueous solution of the monomers to be polymerized. It typically comprises about 30–50% by weight, preferably about 40–50%, of the monomers. It may also contain such materials as sequestrants (e.g., ethtylenediaminetetraacetic acid or its salts).

According to the invention, components A and B are continuously added to the reaction system under conditions and in proportions to produce the desired invert emulsion polymer. These conditions ordinarily include the use of an organic or inorganic free radical initiator and the employment of a temperature high enough to effect activation of the initiator. The initiator may be of several types, including peroxy compounds such as benzoyl peroxide, t-butyl hydroperoxide, potassium persulfate; azo compounds such as azobisisobutyronitrile; and redox systems such as persulfatemetabisulfite. The required temperature when a redox system is employed may be from about 25° to about 100° C. When a peroxy or azo compound is employed somewhat higher temperatures, typically from about 50° to about 150° C. and preferably from about 50° to about 100° C., may be necessary.

As for proportions, a satisfactory invert emulsion is obtained when the weight ratio of component B to component A is between about 3:1 and about 5:1, especially between about 3:1 and about 4.5:1.

To facilitate control of the polymerization reaction, it is frequently advisable to inhibit premature polymerization of the system. This may be done by incorporating a polymerization inhibitor in component B. It may also conveniently be done by saturating component B with oxygen which is an effective inhibitor, and which may be removed by passing nitrogen into the system when it is desired to initiate polymerization.

It is within the scope of the invention to introduce components A and B separately into the reactor, blending them after introduction by the use of a suitable pump or equivalent blending means such as a gear pump. It is also within the scope of the invention to mix components A and B to form a monomer invert emulsion, and then to introduce said monomer invert emulsion into the reactor whereupon polymerization begins when polymerization conditions are attained. Depending on the conditions in the reactor, the polymerization intitiator may be added at or near the point where components A and B are introduced, or it may be added at a later point such as just prior to the stage in which polymerization conditions are attained.

Addition of components A and B, and any additional materials including initiator, proceeds continuously according to the method of this invention. When the reactor is full, a portion of the system is continuously withdrawn. This portion may be analyzed to determine whether polymerization has proceeded to the desired extent. At some point during the process the desired degree of polymerization will be attained, after which time all withdrawn material will be the desired invert emulsion.

The method of this invention is often conveniently carried out in a loop reactor of the type disclosed, for example, in U.S. Pat. Nos. 3,324,093 and 3,551,396, which are incorporated by reference herein for such disclosures. A typical loop reactor will comprise a closed pipe of suitable length and configuration, fitted with one or more inlet means, a single outlet means and emergency pressure relief means such as a blowout disc. Circulation of the system through the reactor will be effected by pumping means. A portion of the reactor will be heated to a temperature high enough for polymerization to take place. The reactor will also be fitted with suitable pressure determining means and valve means governing entry of the polymerization system into the heated portion of the reactor. There will also be bypass means fitted with suitable valve means, whereby the polymerization system can be circulated without passing through the reactor itself.

When a loop reactor of this type is used, it has been found that maintenance of certain parameters insures essentially 100% conversion of monomers to invert emulsion polymer product of acceptable quality. Such quality is exemplified by emulsions prepared from an aqueous monomer solution comprising about 45-50% monomer by weight, having a weight ratio of component B to component A between about 3:1 and about 4.5:1, and having an inherent viscosity (0.1 gram of emulsion dissolved in 100 ml. of 0.5 N aqueous sodium chloride solution) above about 5.0, especially between about 5.0 and about 9.0. Such emulsions are uniformly produced if the residence time of the system in the reactor is at least about 20 minutes and the ratio of circulation rate (rate of movement of the system around the loop, in volume units per minute) to feed rate (rate of introduction of the system into the reactor) is at least about 100.

In the laboratory scale reactor described hereinafter, such parameters can be conveniently maintained by adjusting the feed rate per minute of the monomer invert emulsion to between about 4.4% and about 5.6% of the effective volume of the reactor; that is, total volume less bypass volume. Means for maintaining said parameters in other reactors will be evident to one skilled in the art.

An illustrative loop reactor suitable for use in the method of this invention is shown in the drawing. The monomer invert emulsion is introduced at inlet point 1 into gear pump 2. An optional inlet at point 3 may be used for initiator, or the initiator may be incorporated in the mixture entering at 1 and the inlet at 3 may be absent. The fluid pressure in the reactor is measured by gauge 4. Valve 5 controls fluid flow into coil 6 to which heat is applied, and the polymerization system exits at outlet point 7. The bypass comprises loop 8, in which flow is controlled by valve 9. In case of overpressurization, such as if the reaction gets out of control, blowout disc 10 is activated.

The method of this invention is illustrated by the following examples.

EXAMPLES 1-2

The reactor employed is a laboratory-scale loop reactor as shown in the drawing but lacking the inlet at point 3, and having a volume of about 450 ml.

An aqueous solution is prepared from 797.5 grams of acrylamide, 219.8 grams of sodium 2-acrylamido-2-methylpropanesulfonate and 1147.7 grams of water and is adjusted to a pH of 11.3 by addition of 25% aqueous sodium hydroxide solution. The aqueous solution is added, with stirring, to a solution in 705 parts by weight of mineral oil of the following non-ionic emulsifiers: "Igepal CO-610" [nonylphenoxypoly(ethyleneoxy)ethanol], 13 grams; "Span 80" (sorbitan monooleate), 79 grams; "Tween 85" [poly(ethyleneoxy)sorbitan trioleate], 25 grams. Oxygen is blown into the oil mixture as the monomer solution is added, to inhibit polymerization. To the resulting monomer invert emulsion is added 25 ml. of 0.054 M ethylenediaminetetraacetic acid.

The monomer invert emulsion is blown with nitrogen and pumped into the reactor through inlet 1 in combination with 150 ml. of 0.05 M aqueous potassium persulfate. The persulfate addition rate is 0.5 ml./minute. Coil 6 is heated and other parameters maintained as listed in Table I. Conversion of monomers to polymer is essentially 100%, and the products are the desired copolymer invert emulsions.

EXAMPLES 3-4

The procedure is identical to that of Examples 1-2 except that the monomer invert emulsion is prepared from 997 grams of acrylamide, 275.2 grams of sodium 2-acrylamido-2-methylpropanesulfonate, 1425.8 grams of water, 882 grams of mineral oil, 17 grams of "Igepal CO-610", 99 grams of "Span 80", 32 grams of "Tween 85" and 35 ml. of ethylenediaminetetraacetic acid solution; 110 ml. of potassium persulfate solution is used; and the aqueous monomer solution is adjusted to a pH of 11.5. The parameters listed in Table I are maintained. The products are the desired copolymer invert emulsions.

EXAMPLE 5

The reactor employed is similar to that of Examples 1-4 but includes the inlet at point 3. The oil and aqueous solutions are identical to those of Example 3 except that the aqueous monomer solution is adjusted to a pH of 11.6. The ethylenediaminetetraacetic acid solution is added to the aqueous monomer solution. The aqueous and oil solutions are each blown with nitrogen and are blended just before they are pumped into the reactor through inlet 1; the potassium persulfate solution is added (at 0.5 ml./minute) through inlet 3. Other parameters are maintained as shown in Table I. The product is the desired copolymer invert emulsion.

EXAMPLE 6

Using the loop reactor and procedure of Examples 1-4, an acrylamide homopolymer invert emulsion is prepared from 1222 grams of acrylamide, 1547 grams of water, 650 grams of mineral oil, 260 grams of mineral spirits, 16 grams of "Igepal CO-610", 98 grams of "Span 80", 16 grams of "Tween 85", 25 ml. of ethylenediaminetetraacetic acid solution and 110 ml. of potassium persulfate solution. The parameters listed in Table I are maintained.

TABLE I

| Example | Coil 6 temperature, °C. | Monomer invert emulsion feed rate, ml./min. | Residence time, min. | Ratio, circulation rate:feed rate | Inherent viscosity[1] |
|---|---|---|---|---|---|
| 1 | 65 | 7 | 60.4 | 207:1 | 5.9 |
| 2 | 65 | 15 | 29.2 | 100:1 | 7.5 |
| 3 | 80 | 19 | 23.2 | 120:1 | 6.5 |
| 4 | 65 | 19 | 23.2 | 120:1 | 7.5 |
| 5 | 65 | 21[2] | 21.1 | 109:1 | 8.4 |
| 6 | 65 | 15 | 29.2 | 151:1 | 6.5 |

[1] 0.1 gram of emulsion dissolved in 100 ml. of 0.5 N aqueous sodium chloride solution.
[2] Aqueous monomer solution - 15 ml./min.; oil solution - 6 ml./min.

What is claimed is:

1. A method for preparing an invert emulsion polymer which comprises the steps of:
   (I) continuously circulating, in a loop reactor, under polymerization conditions, a system comprising
      (A) a non-polar liquid which is inert to addition polymerization, and
      (B) an aqueous solution of one or more polymerizable monomers;
   (II) continuously adding components A and B to said system under conditions and in proportions to produce said invert emulsion polymer; and
   (III) continuously withdrawing a portion of said circulating system comprising said invert emulsion polymer.

2. A method according to claim 1 wherein components A and B are mixed and the resulting mixture is added to said system.

3. A method according to claim 1 wherein components A and B are separately added to said system.

4. A method according to claim 1 wherein the residence time of the system in the reactor is at least about 20 minutes and the ratio of circulation rate to feed rate is at least about 100.

5. A method according to claim 1 wherein the reaction conditions include the use of a free radical polymerization initiator.

6. A method according to claim 5 wherein the polymerization initiator is at least one peroxy compound.

7. A method according to any one of claims 1-3 or 5-6 wherein component A comprises mineral oil.

8. A method according to claim 7 wherein component B contains at least one acrylamidoalkanesulfonic acid or salt thereof.

9. A method according to claim 8 wherein component B is an alkaline solution in which one monomer is a salt of 2-acrylamido-2-methylpropanesulfonic acid.

10. A method according to claim 9 wherein the monomers in component B are sodium 2-acrylamido-2-methylpropanesulfonate and acrylamide.

11. A method according to claim 1 wherein the ratio of (B) to (A) is between about 3:1 and about 5:1.

12. A method according to claim 1 wherein component (A) contains a minor amount of an emulsifying agent adapted for stabilization of the invert emulsion.

13. A method according to claim 1 wherein component (A) contains a minor amount of a non-ionic emulsifying agent.

14. A method according to claim 1 wherein component (B) comprises about 30-50% by weight of said monomers.

15. A method for preparing an invert emulsion polymer which comprises the steps of:
   (I) continuously circulating in a loop reactor under polymerization conditions, a system comprising
      (A) a non-polar liquid which is inert to addition polymerization and a minor amount of a non-ionic emulsifying agent, and
      (B) an aqueous solution of one or more polymerizable monomers comprising 2-acrylamido-2-methylpropanesulfonic acid or a salt thereof;
   (II) continuously adding components (A) and (B) to said system to produce said invert emulsion polymer, the ratio of (B) to (A) being in the range of about 3:1 to about 5:1; and
   (III) continuously withdrawing a portion of said circulating system comprising said invert emulsion polymer.

16. A method according to claim 15 wherein component (B) comprises about 30-50% by weight of said monomers.

17. A method according to claim 15 wherein component (B) comprises about 45-50% by weight of said monomer, the weight ratio of (B) to (A) is in the range of about 3:1 to about 4.5:1, and the inherent viscosity of the emulsion is between about 5.0 and about 9.0.

18. A method according to claim 15 wherein the residence time of said system in the reactor is about 20 minutes and the ratio of circulation to feed rate is at least about 100.

* * * * *

UNITED STATES PATENT AND TRADEMARK OFFICE
CERTIFICATE OF CORRECTION

PATENT NO. : 4,419,466                                    Page 1 of 2

DATED : December 6, 1983

INVENTOR(S) : Thomas R. Hopkins

It is certified that error appears in the above-identified patent and that said Letters Patent are hereby corrected as shown below:

On the title page, the following additional references are cited:

U.S. Patent Documents

| | | | |
|---|---|---|---|
| 3,172,737 | 3/65 | Whittington | 23/235 |
| 3,332,904 | 7/67 | LaCombe et al | 260/33.2 |
| 3,547,899 | 12/70 | Ark et al | 260/79.3 |
| 3,718,632 | 2/73 | Gardner et al | 260/80.78 |
| 4,012,560 | 3/77 | Baatz et al | 428/474 |
| 4,029,622 | 6/77 | Keller et al | 260/29.6 |
| 4,052,353 | 10/77 | Scanley | 260/29.6 |
| 4,104,226 | 8/78 | Melzer et al | 260/29.6 |
| 4,331,792 | 5/82 | Gorretta et al | 526/229 |

Foreign Patent Documents

| | | |
|---|---|---|
| 907,795 | 8/72 | Canada |
| 688,546 | 1/68 | South Africa |

Other Prior Art

Geddes, "The Loop Process", *Chemistry and Industry*, March 21, 1983, pp. 223-227.

Warson, "Developments in Emulsion Polymerisation--Grafting and Morphological Problems in the Continuous Emulsion Polymerisation of Vinyl Acetate", *Chemistry and Industry*, March 21, 1983, pp. 220-222.

UNITED STATES PATENT AND TRADEMARK OFFICE
CERTIFICATE OF CORRECTION

PATENT NO.  : 4,419,466
DATED       : December 6, 1983
INVENTOR(S) : Thomas R. Hopkins It is certified that error appears in the above-identified patent and that said Letters Patent are hereby corrected as shown below:

Column 3, line 33, change "emulsion" to --polymer--.

Column 5, Table I, footnote No. 1, change "0.1 gram of emulsion" to --0.1 gram of polymer--.

In claim 17, the word "emulsion" is changed to --polymer-- as follows:

Column 6, line 48, change "emulsion" to --polymer--.

Signed and Sealed this

Twenty-fourth Day of July 1984

[SEAL]

Attest:

GERALD J. MOSSINGHOFF

Attesting Officer          Commissioner of Patents and Trademarks